US011435482B2

(12) United States Patent
Zalewski et al.

(10) Patent No.: US 11,435,482 B2
(45) Date of Patent: Sep. 6, 2022

(54) METHOD FOR VERIFYING THE PLAUSIBILITY OF GNSS POSITION SIGNALS

(71) Applicant: Continental Teves AG & Co. oHG, Frankfurt (DE)

(72) Inventors: Michael Zalewski, Frankfurt am Main (DE); Henrik Antoni, Freigericht (DE); Ulrich Stählin, Eschborn (DE)

(73) Assignee: Continental Teves AG & Co. oHG

( * ) Notice: Subject to any disclaimer, the term of this patent is extended or adjusted under 35 U.S.C. 154(b) by 451 days.

(21) Appl. No.: 15/378,386

(22) Filed: Dec. 14, 2016

(65) Prior Publication Data

US 2017/0090036 A1    Mar. 30, 2017

Related U.S. Application Data

(63) Continuation of application No. PCT/EP2015/063751, filed on Jun. 18, 2015.

(30) Foreign Application Priority Data

Jun. 18, 2014    (DE) ..................... 10 2014 211 788.7

(51) Int. Cl.
*G01S 19/21*    (2010.01)
(52) U.S. Cl.
CPC .................. *G01S 19/215* (2013.01)
(58) Field of Classification Search
CPC ........ G01S 19/21; G01S 19/215; G01S 13/93; G01S 13/931; G01S 15/93; G01S 15/931;
(Continued)

(56) References Cited

U.S. PATENT DOCUMENTS

| 5,771,008 A | 6/1998 | Hayashi et al. |
| 9,075,137 B2 | 7/2015 | Wendel et al. |

(Continued)

FOREIGN PATENT DOCUMENTS

| DE | 102007008853 A1 | 8/2008 |
| DE | 102008020446 A1 | 3/2009 |

(Continued)

OTHER PUBLICATIONS

Chinese Office Action dated Sep. 3, 2018 for corresponding Chinese application No. 201580032490.6.

(Continued)

*Primary Examiner* — Donald H B Braswell

(57) ABSTRACT

The invention relates to different methods for verifying the plausibility of GNSS position signals, including a method for verifying the plausibility of position signals of a global satellite navigation system in a vehicle, said navigation system comprising at least one detection system for detecting objects in the surroundings of the vehicle as well as a reception device for receiving the position signals, said method involving the steps of: having the reception device receive the position signals, and determining the actual position of the vehicle on the basis of the position signals; having the detection system detect at least one object in the surroundings, and determining the position of the object; verifying the plausibility of the position signals by comparing at least one position of an object with the actual position of the vehicle.

9 Claims, 2 Drawing Sheets

(58) Field of Classification Search
CPC ......... G01S 17/93; G01S 19/22; G01C 21/28; G01C 21/26; H04W 4/44; H04W 4/46
See application file for complete search history.

(56) References Cited

U.S. PATENT DOCUMENTS

| | | | |
|---|---|---|---|
| 2011/0102259 A1* | 5/2011 | Ledvina | G01S 19/215 342/357.59 |
| 2011/0161032 A1 | 6/2011 | Stählin | |
| 2011/0207476 A1* | 8/2011 | Qahwash | B60R 25/00 455/456.2 |
| 2012/0053888 A1* | 3/2012 | Stahlin | G01S 19/48 702/150 |
| 2012/0323438 A1* | 12/2012 | Wendel | G01S 5/0027 701/36 |
| 2013/0127664 A1* | 5/2013 | Garin | G01S 19/24 342/357.63 |
| 2013/0251150 A1* | 9/2013 | Chassagne | G01S 1/042 380/270 |
| 2013/0271316 A1 | 10/2013 | Trautenberg et al. | |
| 2015/0048973 A1* | 2/2015 | Whitehead | H04K 3/90 342/357.58 |
| 2016/0370470 A1* | 12/2016 | Mabuchi | G07B 15/063 |

FOREIGN PATENT DOCUMENTS

| | | |
|---|---|---|
| DE | 102011119762 A1 | 6/2012 |
| DE | 102011106591 A1 | 12/2012 |
| DE | 102012007192 A1 | 10/2013 |

OTHER PUBLICATIONS

Luan Qi Wen et al. "A Collection of Pictures of the Latest Automotive Electronic Components", Liaoning Science and Technology Press, Apr. 26, 2004, ISBN-10: 753814109X, ISBN-B: 978-7538141092.

International Search Report dated Jul. 1, 2022 from corresponding EP application No. 22150516.7.

Ovanovic Aleksandar et al, Multi-test detection and protection algorithm against spoofing attacks on GNSS receivers. 2014 IEEE/ION Position, Location and Navigation Symposium—Plans 2014, IEEE, May 5, 2014, pp. 1258-1271, XP032616451, DOI: 10.1109/PLANS.2014.6851501.

* cited by examiner

METHOD FOR VERIFYING THE PLAUSIBILITY OF GNSS POSITION SIGNALS

CROSS REFERENCE TO RELATED APPLICATIONS

This U.S. patent application claims the benefit of PCT patent application No. PCT/EP2015/063751, filed Jun. 18, 2015, which claims the benefit of German patent application No. 10 2014 211 788.7, filed Jun. 18, 2014, both of which are hereby incorporated by reference.

TECHNICAL FIELD

The invention relates to methods for verifying the plausibility of position signals of a global satellite navigation system in a signal receiver, in particular vehicles or land vehicles.

BACKGROUND

The use of a global satellite navigation system (hereinafter abbreviated to GNSS for Global Navigation Satellite System), which may be supported by additional vehicle sensors, wherein the vehicle sensors may be merged with one another, is an established method for determining the actual position of the vehicle. As a rule, the receiver or sensor of the GNSS position signals is the only sensor which supplies an actual position or absolute position of the signal receiver. Likewise, it provides a global time base which can be used to synchronize multiple sensors or systems or car2X/vehicle-to-X (hereinafter abbreviated to V2X for vehicle-2-X) systems.

Vehicle-to-X communications is currently in a phase of development and standardization. This term is understood to mean in particular communication between vehicles (vehicle-to-vehicle communication) and communication between vehicles and infrastructure (vehicle-to-infrastructure communication).

Unlike sensors which are installed in the vehicle, such as IMU, wheel speed etc., the GNSS sensor is influenced by the environment and can be interfered with from externally (including without intervening in the vehicle hardware). In addition to inherent interference such as shadings and the so-called multipath, the GNSS sensor can be deliberately interfered with artificially (jammers) or manipulated (spoofers).

Jammers can, in this case, mask the position signals or useful signals of the GNSS e.g. by means of artificial noise, as a result of which the GNSS reception effectively breaks down and it is no longer possible to obtain a GNSS fix (position solution). This is to be equated with a shading and is noncritical, intermittently, for localization.

On the other hand, spoofers simulate wrong positions, misleading the system in the process, by emitting recorded or artificially calculated GNSS signals. In this case, it is not possible for the GNSS sensor to identify that these are falsified signals. The consequence is an incorrect determination of position and, likewise, an incorrect time base. A system which is interfered with in this manner can interfere with the V2X function through the V2X communications and even transmit errors to other vehicles. This can become a security breach for the V2X system. If the spoofer data is not only fed directly into the spoofer's own system, but is transmitted by radio, the falsification is spread to the entire surroundings and is present in all systems.

The reasons for using jammers or spoofers are manifold and range from private interest—e.g. not wanting to be tracked or monitored—to economic interest such as, e.g. fabricating maximum speeds, rest/break times, road links used and toll plazas, etc.

If the falsified GNSS position signals are not only fed directly into the system of the spoofer but, as is standard with low-cost GPS jammers, transmitted by radio, the manipulations not only have repercussions on the spoofer's own vehicle, but on all of the vehicles in the surroundings, or the entire system within a certain range can be manipulated from externally.

The GPS system (global positioning system) used in nonmilitary circles does not offer any systemic possibility of identifying falsified data, if said data is reasonable and consistent and is not filtered out by plausibility verification.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

It is therefore the object of the invention to illustrate a method, with which the plausibility of received position signals can be checked.

A first aspect of a method for verifying the plausibility of position signals of a global satellite navigation system in a vehicle, includes said navigation system comprising at least one detection system for detecting objects in the surroundings of the vehicle as well as a reception device for receiving the position signals, involving: having the reception device receive the position signals, and determining the actual position of the vehicle on the basis of the position signals; detecting at least one object in the surroundings by means of the detection system and determining the position of the object, wherein the respective position of objects can be called up from an external server; verifying the plausibility of the position signals by comparing at least one position of an object with the actual position of the vehicle.

The basic principle underlying the first aspect of the invention is that it is possible to estimate the actual position of the vehicle by means of the position of the objects from the surroundings which, on the one hand, is independent of the position signals of the GNSS and, on the other hand, is sufficiently precise for verifying the plausibility of the position signals. The detection system is therefore a system which in principle functions independently of the determination of the actual position by means of the position signals of the GNSS.

Different criteria can be taken as the basis for verifying the plausibility, in order to compare the position of an object with the actual position of the vehicle based on the GNSS position signals. In the simplest scenario, a radius about the actual position is used. If the objects are located within the radius, the plausibility of the position signals can be verified. In this case, the tolerance ranges are also to be taken account of during the position determination by means of the GNSS itself. Assuming that spoofers wish to feign a basically incorrect position indication, verification of the plausibility can be denied, if the deviation of the actual position from the position of the object is within a range of several kilometers. Alternatively, it is also conceivable, however, for smaller comparison thresholds to be applied. These could advantageously be compared with additional criteria relating to the situation such as e.g. the same direction of travel, road, etc.

Detecting an object and determining the position of the object is carried out by a message sent by the object itself. This can, for example, be effected by means of a V2X message, in which the object describes itself and its position.

The detection system is, in its most general form, a system for detecting position information from abstract or concrete objects such as, traffic lights, buildings or even digital data which is transmitted via electromagnetic waves.

According to an embodiment, the detection system comprises a camera device and is configured to visually identify objects, in particular landmarks, such as e.g. road signs, city-limit signs, etc. In this way, an extremely wide range of visually detectable objects can be detected by means of the vehicle, for which the position of the respective objects is known. Alternatively, the use of radar or lidar systems, which are not able to detect objects visually, but based on their special signals, is also conceivable.

According to an embodiment the respective position of objects can be called up from a local map or from an external server.

According to an embodiment the detection system comprises a vehicle-to-X or V2X communication device for receiving objects in the form of V2X messages with a position indication of a transmitter of the V2X message. In this case, exchanging the position data with stationary objects, the position of which does not change and which, in the best case, is also specified by a reliable authority, e.g. a government or public institution, is particularly advantageous.

According to an embodiment, verified and/or signed V2X messages are used for verifying the plausibility. In this way, the authenticity of the V2X and the genuineness of the position indication can be guaranteed.

According to an advantageous embodiment of the method according to the invention, the detection system comprises a motion sensor, in particular for identifying accelerations. In this way, bumps in the road, which have a characteristic acceleration curve, are used to establish the actual position of the vehicle. In this case, the identification of fixed bumps in the road, such as e.g. speed bumps, the position of which do not change as a rule, is particularly advantageous.

According to an embodiment the detection system detects one of the objects from the following group: infrastructure devices such as traffic signs, traffic lights, toll stations, tunnels, signposts, city-limit signs; points of interest POI such as public buildings, shops, parking garages; and/or bumps in the road.

A second aspect of a method for verifying the plausibility of position signals of a global satellite navigation system includes determining the actual position of a signal receiver, in particular a vehicle, said signal receiver having a reception device for receiving multiple position signals, involving: having the reception device receive the position signals; analyzing the relative movements between the signal receiver and multiple signal transmitters of the position signals and/or analyzing the relative movements between multiple signal transmitters with respect to one another on the basis of the respective position signals; and verifying the plausibility of the position signals, if there is no correlation between the relative movements.

Underlying the second aspect is the knowledge that genuine or regular position signals from GNSS satellites move independently of one another relative to the signal receiver. The relative movements of the satellites with respect to the signal receiver are not interdependent and do not correlate with one another. It is also probable that those satellites, which are visible to a signal receiver, move interdependently. Indeed, it is possible that a plurality of satellites is present in an orbit and therefore dependencies can occur here and there. As a rule, however, this case differs significantly from the case in which a spoofer simulates multiple position signals originating from a single signal transmitter. As there is only a single signal transmitter in this case, the relative movements of the simulated transmitters or sources correlate with one another and also relative to the signal receiver. Different thresholds of correlations between the relative movements can therefore be set in order to verify the plausibility of the position signals.

According to an embodiment the relative movement between the signal receiver and each signal transmitter is effected on the basis of a Doppler effect measurement and/or phase measurement and/or a measurement of the delta range of the signals received in each case. The term 'delta range' means a change in route or change in distance or the relative speed between a satellite and a signal receiver, e.g. vehicle.

According to an embodiment, the signal strength for each position signal is determined by the signal receiver. Additionally or alternatively to the aforementioned embodiment, this can create a further possibility for identifying spoofers. The signal strength of the position signals which are emitted by spoofers is, as a rule, uniformly strong and significantly stronger than genuine position signals from GNSS satellites. In particular, the uniform change in, i.e. increase or decrease in the signal strength of, the different position signals can be used to identify a spoofer.

According to an embodiment the respective direction from which the respective signal, e.g. position signal of a satellite or another signal of a V2X communication subscriber, is received is determined on the basis of the signal strengths, wherein the plausibility of the position signal is verified, if no other position signal is received from substantially the same directions. "Substantially the same direction", in this case, is a tolerance range which defines the reception direction to be expected. In a three-dimensional space the situation does not occur that two satellites send their position signals from the same direction. They differ in at least one of the spatial directions or vectors. This is not the case with adulterated position signals from a spoofer which, as a rule, all originate from one direction.

According to an embodiment, the receiver has one antenna device with at least one directional antenna and/or multiple antennae. In this way, different analyses of the position signals can be carried out.

This is further achieved according to a third aspect by verifying the plausibility of position signals of a global satellite navigation system in a signal receiver, in particular a vehicle. The navigation system comprising a reception device for receiving the position signals, said method involving the steps of: receiving the position signals for determining the actual position of the signal receiver; comparing the position signals with previous position signals of the signal receiver; and verifying the plausibility of the position signals, if there is no abrupt alteration in characteristics of the received position signals with respect to characteristics of previous position signals.

Underlying the third aspect is the knowledge that position signals disseminated by spoofers, unlike genuine satellite signals of a GNSS, are propagated over a limited region and can therefore be identified by a vehicle by comparing said position signals with preceding position signals. By using position signals which have already been received, the plausibility of which has in particular been verified, abrupt alterations in characteristics of the position signals can be easily identified. By adjusting the jump thresholds, implausible jumps in the position signals can be identified.

According to an embodiment the characteristics of the position signals comprise information about the time or hour used by the transmitter or the time stamp of the position signal. The problem with position signals is, in particular, the precise synchronization of the time indication of the spoofer with the real time of the satellite. A verification of the plausibility of the position signals can therefore be carried out in this way as well.

According to an embodiment, the plausibility of the position signals is verified, if there is no abrupt alteration in the actual position determined on the basis of the position signals with respect to the previous actual positions.

According to an embodiment the method is carried out by an infrastructure device, in particular traffic lights. Two alternatives are conceivable in this case. According to a first alternative, the infrastructure device has a reception device for receiving GNSS position signals. In this way, spoofers can be discovered by simply comparing the actual position deduced by means of the position signals with the stored actual position of the infrastructure device. It is therefore possible to identify falsified GNSS position signals, since these do not fit the expectations and have jumps.

An infrastructure can identify the position and time determined by means of the GNSS, by making a comparison with the stored position and non-disrupted network connection, which equates to a non-disrupted or real time indication, as a contradiction and, thus, a falsified GNSS. In the event that the spoofer also introduces the falsified position data into V2X messages, a V2X communication-enabled infrastructure device can identify the spoofer by means of the incorrect position indications in the V2X message and warn following cars, if necessary. By comparing the actual position and time with the transmitted position and time of an infrastructure, which is preferably transmitted securely and in an encrypted form, a contradiction and, therefore, manipulation of the system's own vehicle can be identified.

According to an embodiment this is carried out in a vehicle, wherein the plausibility of the position signals is additionally verified by means of a method according to any one of the above embodiments in accordance with the first and/or second aspect of the invention. This embodiment makes it possible to also verify the plausibility of the position signals, if a vehicle is located for a lengthy period of time in the range or transmission range of the spoofer position signals and it is therefore not possible to identify implausible position signals by means of a comparison with older position signals in terms of time.

According to an embodiment in the event of an abrupt alteration in the characteristics of the position signals and/or in the actual position as a function of the direction of the change, an entry into or exit from a range or transmission range having a signal transmitter which is transmitting implausible position signals is determined.

In the borderline area between "good" reception and "manipulation", data which does not go together is received via V2X from both ranges, as a result of which a manipulation can be discovered, even if the system's own vehicle is continuously located in the manipulated range and cannot detect any jumps in the actual received position signals.

According to an embodiment a signal transmitter which is transmitting implausible position signals is determined by means of a handshake or verification method. The handshake method comprises a secure transmission of a message via V2X with random content, which is followed by a correct response with respect to the random content. Partial contents of the random content should be the actual position and time, as well as the position and time and confirmation information of the counterpart station, as well as a random number which must be identical in both messages. In this way, replay attacks which are unable to respond correctly to the random contents or which respond correctly, but which reveal a manipulation due to a contradiction or plausibility verification measures, can be eliminated.

According to an embodiment, a signal transmitter which is transmitting implausible position data is determined by means of tracking or a method of elimination.

According to an embodiment this carried out by means of an external system which receives movement information from vehicles which have a V2X communication device.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
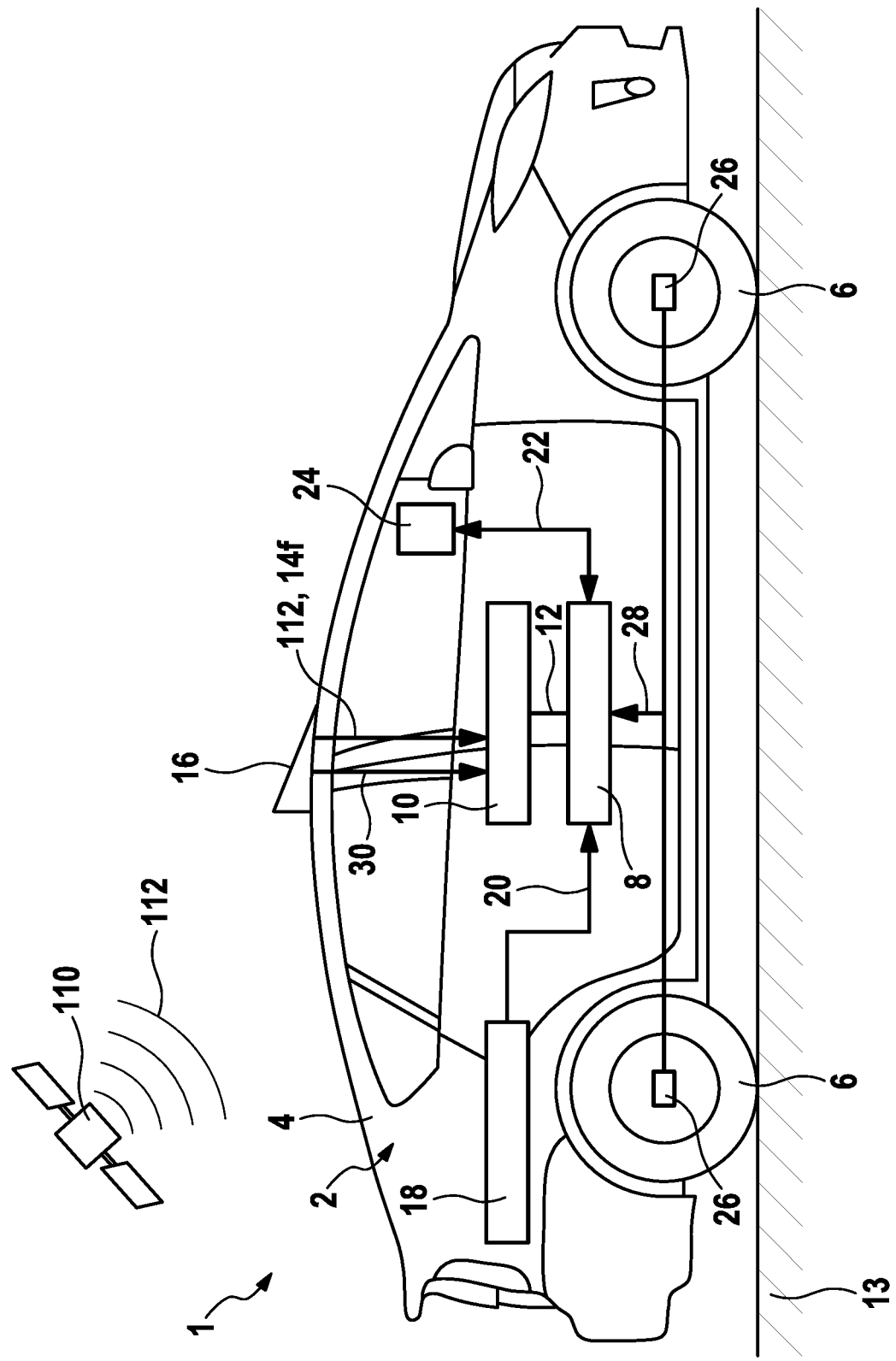
FIG. 1 shows a schematic diagram of a vehicle for executing the method according to the invention.

The same technical elements are provided with the same reference numerals in the figures and are only described once.

Figure 2:
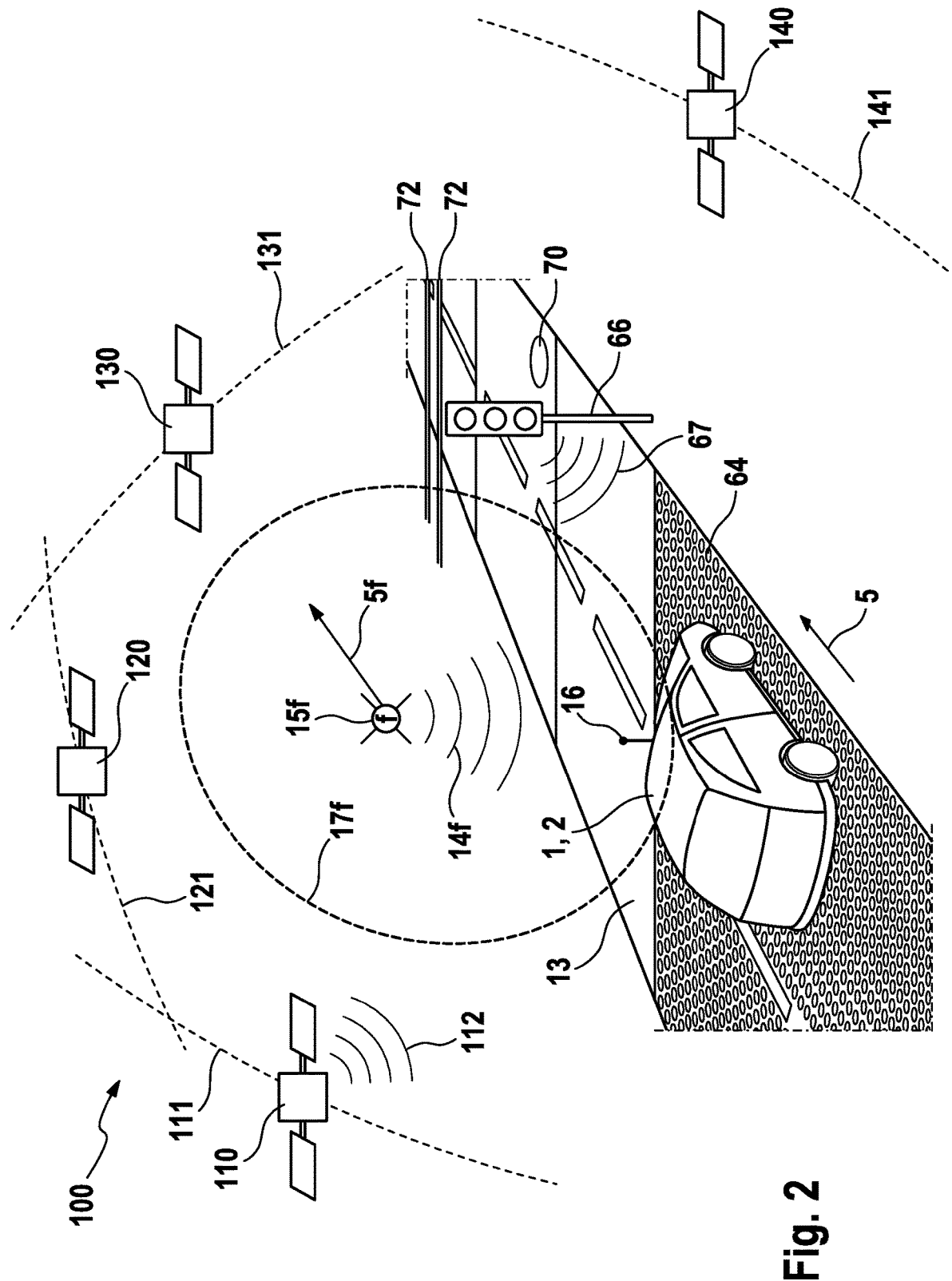
FIG. 2 shows a schematic diagram of a driving situation with a vehicle for executing the method according to the invention.

Reference is made to FIG. 1, which shows a schematic diagram of a vehicle 1 having a chassis 4 which is movably supported on wheels 6 in a driving direction 5 which is indicated in FIG. 2.

In order to determine the actual position or absolute position of the vehicle 1, the vehicle 1 receives multiple position signals 112 from multiple GNSS satellites 110 by means of a GNSS antenna device 16 which is known per se, cf. FIG. 2. By way of example, only one satellite 110 is depicted in FIG. 1. A reception device 10 is connected to the antenna device 16 and evaluates the position signals 112 in such a manner as to determine the actual position therefrom. The absolute position is normally deduced in a manner which is known to the person skilled in the art on the basis of the position signals 112 emitted by GNSS satellites 110. In this example, the antenna device 16 and the reception device 10 are shown and described separately of one another. It is, however, also conceivable that both parts are configured in an integrated manner in a single reception device.

In addition, the vehicle 1 has a detection system 2 for detecting objects and for verifying the plausibility of the actual position. The detection system 2 comprises multiple components 18, 24, 16, 10. The configuration of the detection system 2 described in this embodiment example only represents one configuration. Depending on the requirements, the detection system 2 can be equipped with fewer or more components, which can be specified for example as a function of the methods to be executed.

On the one hand, the detection system has multiple motion sensors in the form of an inertial sensor 18 which detects driving dynamics data 20 of the vehicle 1. This may include the longitudinal acceleration, transverse acceleration as well as vertical acceleration and the roll rate, pitch rate and yaw rate of the vehicle 1. This driving dynamics data 20 is used in the present embodiment, in order to increase the information content of data 12 regarding the actual position of the vehicle 1 and, for example, to specify the position and the speed of the vehicle 1 on the roadway 13. The specified data can then be used by a navigation device, even if the GNSS position signal 101 is not available, for example, in a tunnel. In order to further increase the information content of the actual position, additional motion recording sensors in the form of wheel speed sensors 26, which detect the wheel speeds 28 of the individual wheels 6 of the vehicle 2, can optionally be used as well.

In addition, the detection system 3 comprises an additional sensor cluster 24 for detecting concrete objects. The sensor cluster 24 comprises a camera device, a radar device and a lidar device and makes it possible to detect objects in the surroundings of the vehicle. The data 22 of the sensor cluster 24 can then be used, in order to recognize or identify the objects and to determine the position thereof in the evaluation device 8.

In addition, the detection system comprises a V2X communication device which is integrated in this embodiment example in the antenna device 16 and the reception device 10. It is noted that, within the meaning of the invention, V2X messages 30 denote objects. The antenna 16 is also used to receive and emit V2X messages 30. The reception device 10 has a partition for reading and processing the V2X messages 30. In this way, the position information contained in the V2X messages 30 can be read out, for example. In addition, the reception device 10 makes it possible to check signatures of the V2X messages as well as the conducting of the handshake or verification method with other V2X communication subscribers.

The evaluation system 8 receives data and information regarding the actual position and the surroundings of the vehicle 1 from the different components 18, 24, 16, 10 of the detection system 2 and compares said data and information with one another. Multiple methods are provided to verify the plausibility of the actual position, which can be executed individually or in combination depending on the configuration of the evaluation device 8.

The methods for verifying the plausibility according to the invention are described in more detail below, with reference to FIG. 2.

FIG. 2 shows the following driving situation. The vehicle 1 is driving on the road 13 in the direction of the arrow 5. Located in the field of vision of the vehicle 1 are four GNSS satellites 110, 120, 130, 140, which are each moving in their orbits 111, 121, 131, 141. Each of the satellites 110, 120, 130, 140 emits position signals 112, by means of which the vehicle 1 is able to determine its actual position. For the sake of clarity, the position signals 112 are only shown for the satellite 110. In the same way, the satellites 120, 130, 140 also emit position signals.

In addition to the satellites 110, 120, 130, 140, there is an additional position signal transmitter in the form of a spoofer 15$f$ which is emitting non-authentic or falsified position signals 14$f$. The spoofer 15$f$ transmits its falsified position signals 14$f$ within a transmission range 17$f$ which is limited to the surroundings of the spoofer 15$f$ and which varies depending on the transmitting power. If, however, the vehicle 1 is located within the transmission range 17$f$, the position signals 112 of the satellites 110, 120, 130, 140 are loaded. This can result in an actual position of the vehicle being determined, when the vehicle is located in an entirely different location.

The spoofer 15$f$ can be, for example, a stationary or a moving vehicle on the road 13. The direction of movement of the spoofer 15$f$ is shown here by means of the arrow 5$f$. Similarly to the satellites 110, 120, 130, 140, the spoofer 15$f$ emits position signals 14$f$ which are intrinsically plausible and which are sufficient to determine the actual position of the vehicle 1. However, the position signals 15$f$ do not originate from different signal transmitters, as is the case with the satellites 110, 120, 130, 140. It is true, therefore, that the actual position of the vehicle 1 can be determined, but it does not coincide with the real actual position of the vehicle 1. The incorrect actual position could have a deviation of several kilometers compared with the real actual position.

According to a first embodiment example, a check or verification of the plausibility of the position signals 14$f$ can be carried out on the basis of the following steps.

The position signals 14$f$ of the spoofer 15$f$ are first received via the antenna device 16 of the reception device 10. The reception device 10 determines the actual position of the vehicle 1 on the basis of the spoofer position signals 14$f$ in the same way as regular position signals are used for determining the actual position.

Parallel to this, the detection system 2 detects multiple objects 66, 64 in the surroundings and determines the positions of the objects 66, 64. In this example, the vehicle 1 detects the traffic lights 66 by means of the camera device of the sensor cluster 24. The paving block road 64 is detected via the inertial sensors 18. It is true that the latter only makes it possible to locate the respective object in certain areas, but can suffice for verifying the plausibility. Other bumps in the road such as, for example, a manhole cover 70 or road ramps 72 make it possible to locate the object and, thus, the surroundings of the vehicle more precisely by means of the motion sensors. The respective position of objects can be called up, for example, from a local map or from an external server. It is also conceivable that the traffic lights are equipped with a V2X communication device and send V2X messages 67, in which the position of the traffic lights is described. It is particularly advantageous if the messages 67 are signed.

Additionally or alternatively, it is conceivable that certain objects such as signs at the entrance to towns or signposts are detected by means of the camera device, and are evaluated by the evaluation system in terms of content. In this way, the exact position of the vehicle 1 can be determined solely on the basis of the identification of the object.

By comparing the positions of the traffic lights 66 and the paving block road 64 with the actual position of the vehicle 1, it can be ascertained that a deviation between the actual position of the vehicle and the position of the objects exists, for example in the order of several kilometers. Since this deviation is significantly above the error tolerance of the GNSS, the position signals 14$f$ are identified as being implausible and are not used for applications in the vehicle. In addition, a warning about V2X messages can also be issued.

Objects for verifying the plausibility of the actual position may include, amongst others; infrastructure devices such as traffic signs, traffic lights, toll stations, tunnels, signposts, city-limit signs, points of interest POI such as public buildings, shops, parking garages, and/or bumps in the road.

A second embodiment example for verifying the plausibility of the actual position is described hereinafter. In the first step 10, the position signals 14*f* are received and the actual position of the vehicle 1 is determined therefrom as already described above.

The position signals 15*f* received are analyzed by means of a measurement of the Doppler effect or the phase or delta range (changes in distance), as is already known from the distance measurement of GNSS position signals. Firstly, the relative movement between the signal receiver, or the vehicle 1, and the signal transmitter can be determined by means of these measurements. As a rule, the relative movement of the satellites 110, 120, 130, 140 with respect to the vehicle 1 can be determined from the position signal 112 of the satellites. Since each satellite 110, 120, 130, 140 moves in its own orbit 111, 121, 131, 141 independently of the other satellites 110, 120, 130, 140, there is no correlation in these relative movements. However, in the case of the spoofer 15*f*, the situation is that the latter can indeed simulate multiple signal transmitters. However, these all originate from the same source, so that the relative movement between the simulated signal transmitters and the vehicle 1 has a correlation, i.e. the relative movements are dependent on one another.

If such a correlation is established, it is possible to conclude that the position signals 14*f* are falsified and the plausibility of these should not be verified.

Additionally or alternatively, the signal strength and/or the direction of the signal can be used as a basis for establishing the plausibility of the position signal 14*f*. On the basis of the signal strengths the respective direction from which the respective position signal is received can also be determined. The plausibility of the position signal 14*f* is only verified, if no other position signal is received from substantially the same directions. To this end, it is advantageous to equip the antenna device 16 with at least one directional antenna and/or multiple antenna modules. If it is known from which direction the position signals of the actual satellite have to come, the plausibility of a position signal can be verified in this way on the basis of the direction.

A third embodiment example for verifying the plausibility of the actual position is described hereinafter. In the first step, position signals 14*f* for determining the actual position of the signal receiver or vehicle 1 are received in a corresponding way to the previous embodiment examples.

In the second step, these position signals 14*f* are compared with previous or older position signals of the vehicle 1. This step can, for example, be carried out in the evaluation device 8. The terms 'previous or older position signals' denote those signals which were received earlier in time. The applicable period of time of the older position signals can be predefined or selected as a function of movement activity, e.g. speed of the vehicle. Alternatively, recourse can also be had to those position signals, the plausibility of which has already been verified by means of other methods, for example the two aforementioned embodiment examples.

In this way the following situation is set up for the vehicle 1 in FIG. 2. The vehicle 2 is just entering the transmission range 17*f* of the spoofer 15*f* from the transmission range of the regular GNSS satellites 110, 120, 130, 140. The two different transmission ranges can also be defined as regular and irregular or authentic and non-authentic transmission ranges. If the vehicle then moves from a regular transmission range into the irregular transmission range 17*f*, the characteristics of the position signals change such as e.g. phase, running time, time stamp and other information which is contained in a GNSS position signal, because the spoofer 15*f* is not able to precisely mimic the satellites in a time synchronous manner with reality. Finally, the actual position of the vehicle 1 also changes. These changes in the characteristics are abrupt, so that as a result of such a sequence of changes a transition from a regular transmission region to an irregular transmission range 17*f* can be identified and the plausibility of the position signals 14*f* should not be verified.

If a vehicle is located within the irregular transmission range 17*f* for a lengthy period of time, the plausibility of the position signals 14*f* cannot be verified with this method. The aforementioned embodiment examples can be useful here, in order to nevertheless verify the plausibility of the position signals 14*f*. Therefore, a combination of the embodiment examples is particularly advantageous. In particular, the exchange of V2X messages with position indications makes it possible for a vehicle to also verify the plausibility in such a case.

The embodiment example described here is not only restricted to use in a vehicle. In one manner, the method can also be implemented in an infrastructure device. For example, traffic lights 66 could be equipped with a GNSS position signal receiver. If a spoofer 15*f* were to pass by, the latter would compare the position signals 14*f* thereof with actual position signals, position information or actual position. As the actual position of the traffic lights 66 does not change, this information base could be used as a fixed reference point. A GNSS position signal 14*f*, which results in a different actual position, could in this way be quickly identified as a spoofer 15*f*.

In the event that the spoofer 15*f* is a vehicle with a V2X communication device which, in addition to the falsified position signals 14*f*, also sends V2X messages with correspondingly false position information, it would be helpful to implement a handshake or verification. The handshake involves: sending an inquiry from a first vehicle to a second vehicle with a variable or random variable, wherein the response to be expected to the inquiry by the second vehicle to the first vehicle depends on the variable or random variable; the first vehicle receiving the response of the second vehicle; and checking the response as a function of the variable or random variable.

Since a spoofer 15*f* would routinely or by default provide its V2X messages with falsified position information, this fact could be exploited to identify the spoofer. A spoofer would not be able to answer an inquiry containing a variable or random variable with respect to the position information correctly, as a result of which no valid handshake would take place.

A spoofer 15*f* can be reliably identified by means of the plausibility or lack of plausibility. Starting therefrom, different solutions can be provided in a V2X network, in order to track the spoofer 15*f*.

One possibility is that, in the event of an abrupt alteration in the characteristics of the position signals and/or the actual position, the direction of the change is examined, in order to be able to establish whether the vehicle has entered or exited an irregular range. When there is a busy flow of traffic, the border of the irregular transmission range 17*f* can be quickly identified in this way. This information is usefully forwarded to an external evaluation system which merges and analyzes the information. This could reduce the circle of suspected vehicles by contextually filtering the information, for example direction of travel, speed of vehicles, etc. to such an extent that a vehicle is ideally identified as a spoofer 15f. This could then be further tracked via the V2X by suitably authorized locations.

It should be noted that the architecture of the detection system 2 described here is only one example and the described functions and methods can be achieved based on other architectures. The invention is therefore not to be restricted to the example described here.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the scope of the following claims.

The invention claimed is:

1. A method for verifying plausibility of position signals of a global satellite navigation system for a vehicle comprising:
   receiving the position signals with a reception device in a signal receiver wherein the signal receiver is a vehicle;
   determining an actual position of the signal receiver from the received position signals;
   comparing the position signals with previous position signals of the signal receiver; verifying the plausibility of the position signals when alteration in characteristics of the received position signals with respect to characteristics of preceding position signals is below a comparison threshold; and
   determining one of an entry into and an exit from a range having a signal transmitter which is transmitting implausible position signals has occurred based upon a direction of change.

2. The method according to claim 1, wherein the characteristics of the position signals comprise information about the time used by a transmitter.

3. The method according to claim 1, wherein the plausibility of the position signals is verified when the actual position determined on the basis of the position signals with respect to the previous actual positions is below the comparison threshold.

4. The method according to claim 1, wherein the method is carried out by an infrastructure device.

5. The method according to claim 1, further comprising verifying a signal transmitter which is transmitting implausible position signals by a handshake verification.

6. The method according to claim 1, further verifying a signal transmitter transmitting implausible position data by one of tracking of the position signal and elimination of the signal receiver as a spoofer.

7. The method according to claim 6, wherein an external evaluation system receives position information from vehicles which have a V2X communication device.

8. The method according to claim 1, wherein the position signals are one of chipping codes; position data obtained by the receiver from chipping codes; and data contained within the position signal.

9. The method according to claim 8, wherein the data contained within the position signal is at least one of phase, running time, and a time stamp.

* * * * *